Nov. 20, 1956    N. J. TAYLOR ET AL    2,770,807
SAFETY GOGGLE

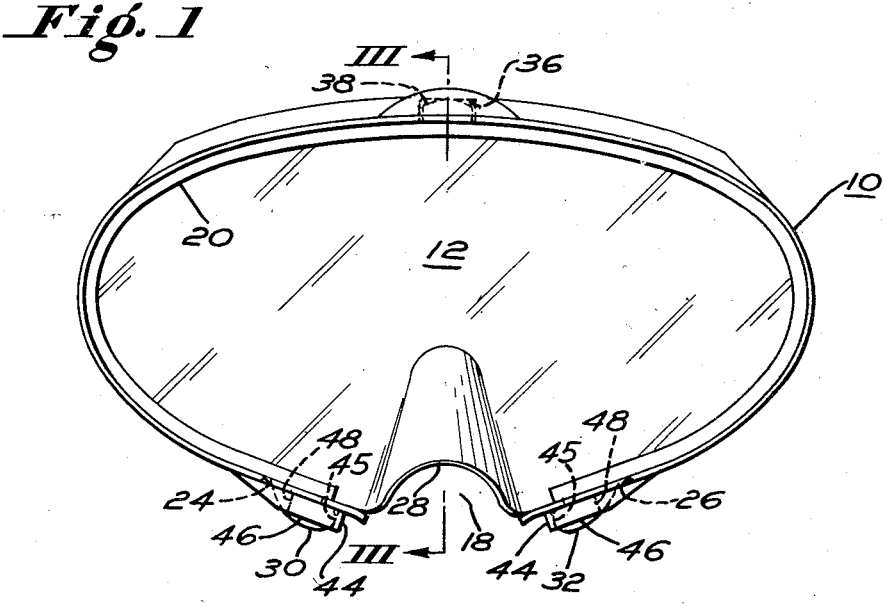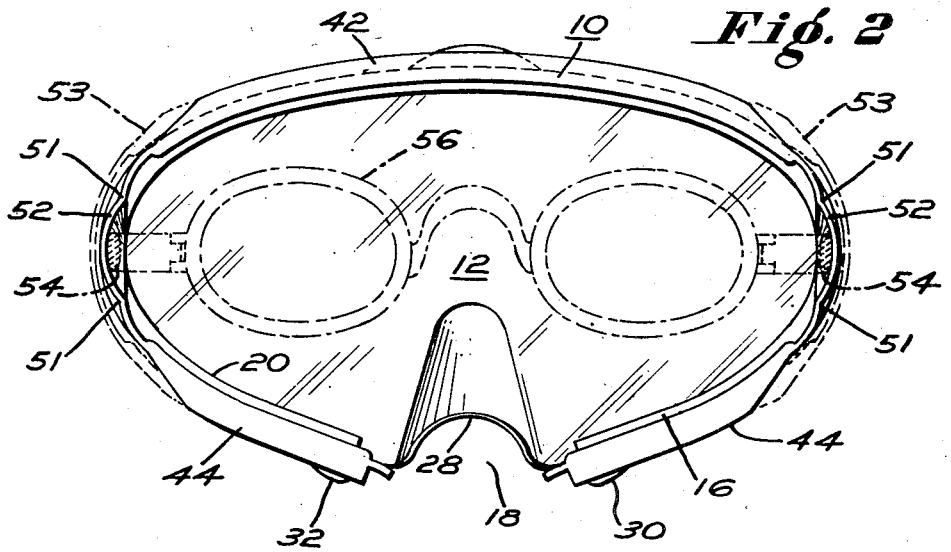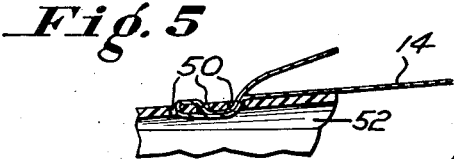

Filed Jan. 13, 1954    2 Sheets-Sheet 2

INVENTORS
NORMAN J. TAYLOR
and ROY A. BRIGHT
BY:
Beau, Brooke, Buckley & Beau,
ATTORNEYS.

United States Patent Office 2,770,807
Patented Nov. 20, 1956

2,770,807

SAFETY GOGGLE

Norman J. Taylor, Kenmore, and Roy A. Bright, North Tonawanda, N. Y., assignors to Virginia I. Du Bois, Snyder, Lauriene T. Holzworth, Rita C. Sterne, and Eileen Silbert, Buffalo, and Florence E. Taylor, Kenmore, N. Y.

Application January 13, 1954, Serial No. 403,689

2 Claims. (Cl. 2—14)

The present invention relates to improvements in safety goggles.

Whereas, prior art eye shield devices disclose various flexible plastic frames provided with groove means adapted to admit a generally oval-shaped plastic lens in detachably interlocked relation therein, it is a primary object of the present invention to provide improved means for detachably interlocking the lens and frame.

Another object of the invention is to provide an improved goggle frame adapted to easily accommodate the temple arms of a pair of spectacles and head-strap attachments while at the same time being formed so as to facilitate flexing of the frame sides to conform to and fit the facial features of various users.

Further objects and advantages of the invention will appear from the specification hereinafter.

In the drawings:

Fig. 1 is a front elevational view showing an embodiment of the invention;

Fig. 2 is a rear elevational view of the device of Fig. 1 showing the wearer's spectacle frame in outline form as it would be accommodated therein and also showing the casing elastically deformed into the dotted line positions shown;

Fig. 5 is a fragmentary sectional view taken generally along line V—V of Fig. 3.

Figure 3:
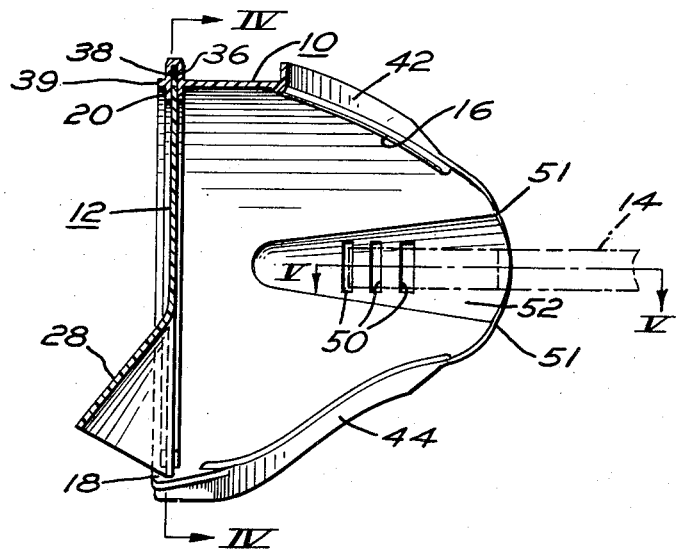
Fig. 3 is a partly sectional view taken along the line III—III of Fig. 1.

Referring now to the drawing the embodiment of the invention illustrated therein comprises generally a frame or casing 10 made of a relatively soft elastic plastic material, a lens 12 made of a shatterproof transparent material being detachably fitted in the casing 10, and a head band 14 (Fig. 3) fixed to the casing in the hereinafter described manner so that it can be readily adjusted to suit the head of the wearer.

The frame or casing 10 is shaped or molded in one piece as for example from a plastic material such as "vinylite," or the like, which is relatively soft and elastic and capable of being flexed and stretched around the periphery of the lens 12 to assume a substantially oval form, as shown in Figs. 1, 2, and 5.

It will be appreciated that the casing 10 will be formed at its rear edge into a concavely shaped marginal edge portion 16 (Figs. 2 and 3) adapted to conform to the contour of the wearer's facial features in the vicinity of the eyes and will be made of sufficient depth to enable it to be worn over one's spectacles. As shown in Figs. 1 and 2, the casing 10 will preferably be disjointed at the bottom in the manner indicated at 18 to bridge the nose of the wearer and also to enable such casing to be elastically deformed incidental to assembly or disassembly of the goggle.

A ridge 20 is preferably formed to protrude along the inner side of the casing 10 adjacent and coparallel with its front edge, the casing being cut centrally of the ridge 20 to provide a pair of spaced ribs defining an inwardly-facing groove or channel-way 22 having a pair of spaced locking slots 24 and 26 located in the bottom thereof adjacent the respective ends of the casing 10.

The lens 12 is preferably blanked for example out of a sheet of plastic material such as cellulose acetate into a generally oval form interrupted medially of its lower edge portion by an outwardly bowed conical portion 28 which is adapted to fit over the nose of a wearer, and having a pair of integral opposed hook projections 30—32 depending from the marginal edge lens portions adjacent to and at opposite sides of the nose support portion 28 and then pointing inwardly toward each other as shown in Figs. 1, 2, and 3.

It will be appreciated that the marginal edge of the lens 12 will be fitted into the groove 22 of the casing 10 as the casing is flexed and stretched around the lens to be detachably hooked thereto in assembled relation by virtue of the casing ends being connected through the locking slots 24 and 26 to their respective lens hook projections 30 and 32. The spacing of the hook portions 30 and 32 relative to the spacing of the outer ends of the casing slots 24 and 26 will be such that in assembled condition the casing will remain elastically deformed within its elastic limits to maintain the marginal edge of the lens 12 in firmly abutting relation against the bottom of the casing groove 22.

Figure 4:
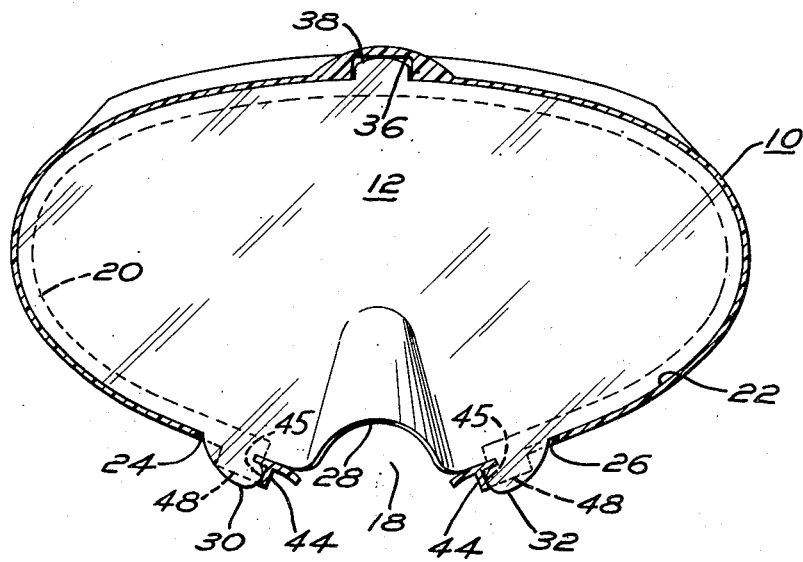
Fig. 4 is a partly sectional view taken along the line IV—IV of Fig. 3.

It is a particular feature of the invention to provide a recess 36 in the bottom of the groove 22 of the casing 10 substantially medially of the lens hook slots 24 and 26, and an upwardly extending integral boss portion 38 substantially medially of the upper marginal edge of the lens 12, both being adapted to cooperate in snugly fitting engagement when in assembled relation as shown in Figs. 1, 3 and 4 to maintain the casing 10 in firmly elastically locked position upon the edge of the lens 12.

To assemble the goggle, one end portion of the casing 10 will be first hooked over one of the lens hook portions 30 or 32 through its respective locking slot 24 or 26 and then the casing will be wrapped around the lens to snugly fit the marginal edge of the lens into the groove 22 whereby the lens boss 38 will fit into the mating recess 36. The opposite end of the casing will be elastically extended to permit hooking thereof through its slot over the opposite lens hook portion, whereupon relaxation of the stretching force will cause the casing to contract into the hereinabove described locked position. It will be appreciated to be another feature of the invention that the front edge portion of the goggle casing protrudes forwardly beyond the ridge 20 in the manner indicated at 39 in Fig. 3. Thus, the walls of the lens groove 22 will be rigidly maintained against deformation outwardly of the planes of the surfaces of the lens 12 upon flexing and stretching of the casing during assembly with the lens as aforesaid. As a result, the lens 12 will be firmly anchored in the casing 10 to maintain the bend alignment and to prevent the development of openings through which foreign particles may pass into the goggle.

The concavely-shaped rear edge 16 of the casing 10 is preferably outwardly flanged along its upper and lower edges, as indicated at 42 and 44, respectively, to present a smooth surface where the goggle contacts the forehead and cheeks of the wearer. The lower flange 44 preferably continues around the companion disjointed lower ends of the casing 10 toward the front edge thereof adjacent the inner ends of the slots 24—26 and branches outwardly therefrom parallel to and at opposite sides of such slots into pairs of integral slot reinforcing portions as indicated at 46 and 48. It will be understood to be another feature of the present invention that the inner ends of the lens hook portions 30—32 will be arranged to abut the parts of the flange shoulder 44 formed inwardly of the slots 24—26 as indicated at 45 (Figs. 1 and 4) when in assembled condition, whereby the inner ends of such slots will be protected against mutilation by the relatively harder lens edge during use of the goggle.

The head strap or band 14 of the goggle is preferably attached to the casing thereof by means of a built-in buckle construction consisting of a plurality of parallel slots 50 disposed at opposite ends of the casing 10 as shown in Fig. 3 and into which the free ends of the head strap are threaded in an interlooping fashion. Three of such slots are formed at each end of the casing, the corresponding end of the head strap being threaded in reverse or intertwined fashion through the slots and about the intervening webs resulting therefrom, with the free end of the strap then passing over the inner side of the casing and outwardly through the entering slot (Fig. 5). Thus, the head strap can be readily adjusted by the user as desired without the use of separate buckles or other fastenings.

It is a still further feature of the invention that the side portions of the goggle casing adjacent the head strap buckle-slotted portions 50 thereof will be formed into cissoidal-like fluted portions 51 at their rearmost ends, such flute portions being arranged to converge in forwardly tapering relation along said side portions forming generally conic casing distentions or bulges 52 to accommodate the head strap ends thereat. These casing distentions 52 will preferably be formed of reduced thickness to effectively facilitate flexing of the casing side portions to fit around the temples of various wearers without undue pressure thereon. Furthermore, since the bulging portions 52 will be of smaller radius than that of the contiguous casing within any common plane taken therethrough, the sides of the goggle casing will be readily flexible and elastically deformable as for example into the dotted line positions thereof shown at 53 in Fig. 2 to conform to various facial features and head sizes. Also, the bulge portions 52 will provide clearance as indicated at 54 for the temple arms of a pair of spectacles 56 shown by dotted lines in Fig. 2 to alleviate annoying pressures on the temples of a wearer of a goggle of the invention thereby reducing worker fatigue and also thereby improving worker and job safety. In the event that no spectacles are worn it will be appreciated to be still another feature of the invention that by virtue of the formation of the goggle casing into the aforesaid built-in buckle construction in the distended portions 52, the pressure of the head strap at the ends thereof (Fig. 5) will urge the marginal ends flat against the sides of the wearer's face to provide a dust seal thereat.

Therefore, it will be understood that although only one form of the invention has been shown and described in detail it will be apparent to those skilled in the art that the invention is not so limited but that various changes may be made therein without departing from the spirit of the invention or the scope of the appended claims.

What is claimed is:

1. A goggle comprising a lens formed of transparent sheet material of generally continuous rounded profile form being outwardly distended into a conical nose rest portion medially of the bottom edge thereof, the bottom marginal edge of said lens having a pair of downwardly projecting, integrally formed hook members located immediately adjacent to and on opposite sides of said nose rest portion, each hook member presenting a retaining slot having its open end adjacent said nose rest portion, and a unitary casing formed of elastic sheet material of generally C-shaped configuration having its rear edge shaped to generally conform to the facial features of the goggle wearer and having its forward portion embracing the periphery of said lens member, said casing having a pair of inwardly projecting, spaced ribs formed on the inner surface thereof and extending parallel to the front edge of the casing, the most forwardly disposed rib being spaced rearwardly from said front edge of the casing so that a forward marginal edge portion of the casing extends therebeyond to provide a rigidifying flange inhibiting flexing of said forwardly disposed rib, the marginal edge of said lens being received in the groove defined by said ribs, and said casing being apertured adjacent its opposite ends in the region between said ribs and receiving said hook portions of the lens, the casing portions immediately beyond such apertures and between said ribs being received in said retaining slots formed by said hook members, the opposite ends of the rear edge of said casing having outwardly projecting flanges formed integrally therewith to present smooth, flat surfaces where the casing contacts the wearer's face, and the terminal portion of each flange at its corresponding end of the casing extending back upon itself to present a generally U-shaped cross-sectional configuration embracing its corresponding hook member.

2. The assembly as defined in and by claim 1 wherein said lens is provided with an integral upstanding boss portion disposed substantially medially of the upper marginal edge thereof, and said casing having a recess therein receiving said boss portion of the lens.

References Cited in the file of this patent

UNITED STATES PATENTS

| 1,905,130 | Binder | Aug. 25, 1933 |
| 2,406,998 | DuBois | Sept. 3, 1946 |

FOREIGN PATENTS

| 663,002 | Great Britain | Dec. 12, 1951 |